(12) United States Patent
Vos et al.

(10) Patent No.: US 9,673,514 B2
(45) Date of Patent: Jun. 6, 2017

(54) DIMENSIONALLY TOLERANT MULTIBAND CONFORMAL ANTENNA ARRAYS

(71) Applicant: Lockheed Martin Corporation, Bethesda, MD (US)

(72) Inventors: David L. Vos, Apalachin, NY (US); Carl Baldwin, Mansfield, TX (US); David R. Darling, Orlando, FL (US); Brian W. Kaplun, Endicott, NY (US); David R. Dorough, Winter Park, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 491 days.

(21) Appl. No.: 14/467,431

(22) Filed: Aug. 25, 2014

(65) Prior Publication Data
US 2015/0303554 A1    Oct. 22, 2015

Related U.S. Application Data

(62) Division of application No. 13/346,305, filed on Jan. 9, 2012, now Pat. No. 8,847,823.

(51) Int. Cl.
*H01Q 1/38* (2006.01)
*B32B 37/12* (2006.01)
*H01Q 1/28* (2006.01)
*H01Q 21/28* (2006.01)

(52) U.S. Cl.
CPC ............ *H01Q 1/38* (2013.01); *B32B 37/12* (2013.01); *B32B 2457/00* (2013.01); *H01Q 1/287* (2013.01); *H01Q 21/28* (2013.01)

(58) Field of Classification Search
CPC .......... H01Q 1/38; H01Q 1/287; H01Q 21/28; B32B 2457/00; B32B 37/12
See application file for complete search history.

(56) References Cited

U.S. PATENT DOCUMENTS

| | | |
|---|---|---|
| 5,039,992 A | 8/1991 | Lenormand et al. |
| 6,198,445 B1 | 3/2001 | Alt et al. |
| 7,023,390 B1 | 4/2006 | Kim et al. |
| 7,057,565 B1 * | 6/2006 | Liu ........................ H01Q 1/242 343/700 MS |
| 7,397,429 B2 | 7/2008 | Crain et al. |
| 7,557,768 B2 | 7/2009 | Baliarda et al. |
| 7,679,565 B2 | 3/2010 | Sorvala |
| 7,760,149 B2 | 7/2010 | Hook |
| 8,405,561 B2 * | 3/2013 | Handy ................. H01Q 21/065 343/705 |
| 2007/0254456 A1 | 11/2007 | Maruyama et al. |

(Continued)

*Primary Examiner* — Jacob T Minskey
*Assistant Examiner* — Vishal I Patel
(74) *Attorney, Agent, or Firm* — Wolf, Greenfield & Sacks, P.C.

(57) ABSTRACT

Some embodiments relate to a multiband antenna array formed on a flexible substrate. Low frequency antenna elements may be formed using nanoink. High frequency elements may be provided on a prefabricated antenna chip. The antenna array may be heated in a low temperature oven to sinter the nanoink into a solid antenna element. In some embodiments, an adhesive insulation layer may be provided which allows the antenna array to be attached to any surface. In other embodiments, the antenna array may be embedded in a composite material.

22 Claims, 6 Drawing Sheets

(56) References Cited

U.S. PATENT DOCUMENTS

2008/0303729 A1   12/2008  Milosavljevic et al.
2010/0097273 A1    4/2010  Biris et al.
2010/0177011 A1    7/2010  Sego et al.
2011/0304520 A1* 12/2011  Djordjevic ......... H01Q 21/0087
                                                 343/893

* cited by examiner

DIMENSIONALLY TOLERANT MULTIBAND CONFORMAL ANTENNA ARRAYS

BACKGROUND

1. Related Applications

This application claims the benefit of 35 U.S.C 120 as a divisional application of U.S. patent application Ser. No. 13/346,305 filed Jan. 9, 2012 entitled "Dimensionally Tolerant Multiband Conformal Antenna Arrays," the entire contents of which is incorporated herein by reference.

2. Technical Field

The techniques described herein relate to dimensionally tolerant high-frequency, multiband conformal antenna arrays and a process for constructing such antenna arrays.

3. Discussion of Related Art

Modern combat vehicles, including air vehicles, water vehicles, and land vehicles, may utilize a wide variety of communications and electronic surveillance technologies. In the past, each different technology required a separate antenna, resulting in upwards of twenty antennas per vehicle. As technology progresses, new antennas may need to be installed, which requires retrofitting the new antennas onto vehicles that were not designed with the additional antennas in mind. This may become problematic, especially in air vehicles such as unmanned air vehicles and helicopters, where the additional weight and drag from the retrofitted antennas may significantly affect aircraft range, speeds and maneuverability. Further, the addition of, for example, blade antennas to the belly of the fuselage of an aircraft risk being damaged if the aircraft that may land on uneven surfaces.

Additionally, each antenna on a vehicle may operate in a different frequency range. Antennas that receive low frequency radio frequency (RF) signals, such as HF, VHF and UHF, are large in size because antenna performance is significantly degraded if the antenna size is not at least a quarter the size of the wavelength of the radiation. For this reason, low frequency RF antennas may range from 1-20 feet in size. Such large antennas are difficult to incorporate into combat vehicles for many of the same reasons listed above. Further, large antennas that are constructed using rigid materials are more susceptible to damage than smaller antennas made from the same material.

SUMMARY

Some embodiments relate to a dimensionally tolerant, multiband antenna array. Both high frequency and low frequency antenna elements may be included within the antenna array. The high frequency antenna elements may be created on an inflexible substrate, while low frequency antenna elements may be created on a substrate, such as a flexible substrate or a rigid substrate. In some embodiments, the low frequency elements are created using a nanoink, comprising nanoparticles. The nanoink may be applied using an inkjet nozzle or a micropen dispenser. The nanoink may be sintered in a low temperature oven, creating the both the low frequency antenna traces and interconnections for the high frequency antenna elements.

In some embodiments, an additional flexible insulation layer is created over the antenna array. The flexible substrate and/or the flexible insulation layer may be adhesive on one side, making the antenna array an appliqué that may be applied to the surface of a vehicle.

In some embodiments, the antenna array may be created within a composite material, such as a fiber composite. The fiber may be, in some instances, carbon fiber.

Some embodiments relate to a method for creating a multiband antenna array. Nanoink may be applied to a flexible substrate for low frequency antenna elements. High frequency antenna elements may be provided on a chip comprising an inflexible substrate. The nanoink and may be sintered by heating the multiband antenna array as a whole.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that the size and weight of antennas may be significantly reduced by using nanoink technology, while simultaneously providing the ability to retrofit antennas onto vehicles with little to no impact on speed or maneuverability.

Nanoinks are a solution or paste of nanoparticles mixed with some "carrier solution" that controls the viscosity of the nanoink. The nanoink of some embodiments may be formulated in any suitable way and is not limited to any particular type. The carrier solution is not limited in any way, but may be, for example, optimized based on the method used to apply the nanoink. In some embodiments, the carrier solution may comprise a solvent. Any suitable solvent may be used; the invention is not limited in this respect. For example, the solvent may be water, an alcohol, a hydrocarbon fluid or some other organic fluid. The carrier solution may also comprise a dispersant to maintain the nanoparticles in suspension within the solvent.

The nanoparticles in the nanoink may be, for example, electrically conductive nanoparticles. The prefix "nano" refers to the fact that the nanoparticles have a diameter that is best described in terms of nanometers (or $10^{-9}$ meters). The nanoparticles may have a diameter ranging from 1 nanometer to about 2500 nanometers. The nanoparticles within a nanoink may be a consistent size with a well-defined range of diameters, or they may range in size. In some embodiments the nanoparticles are metallic. For example, the nanoparticles may be silver, gold, copper, platinum, aluminum, tungsten, nickel or any other metal. A nanoink is not limited to be comprised of a single metal and may contain several different metals in a single nanoink. In other embodiments, the nanoparticles may be carbon-based. For example, the nanoparticles may be carbon nanotubes or buckminsterfullerene.

The melting point of the metallic nanoparticles in nanoink may be much lower than the melting point of a bulk material made of the same metal. Therefore, sintering of nanoink may occur at a relatively low temperature compared to other techniques for melting metal, such as brazing and soldering. For example, nanoink may be sintered in an oven set to the range of 100-300° C. This may allow sintering to be used to melt the nanoparticles while in contact with other components of the antenna array that may be sensitive to high temperatures. Accordingly, new methods of manufacturing antenna arrays, as well as new forms of antenna arrays are possible using nanoinks.

Figure 1:
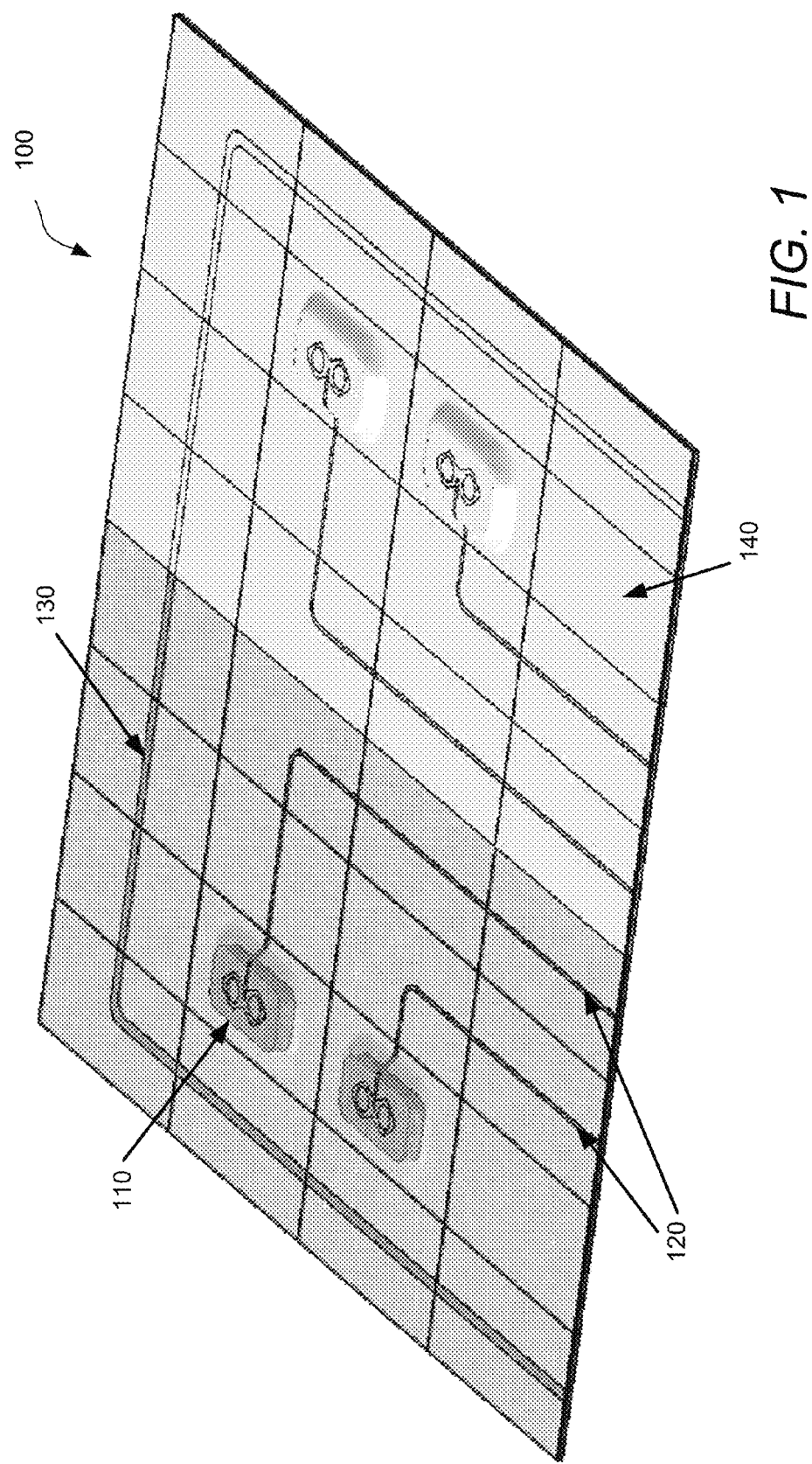
FIG. 1 is a simplified view of a portion of a multiband antenna array, according to some embodiments.

FIG. 1 illustrates a simplified view of a portion of a multiband antenna array 100 according to some embodiments. "Multiband" refers to the presence of both low frequency antenna elements 130 and high frequency antenna elements. "Low frequency" and "high frequency" refer to frequencies within the electromagnetic spectrum that are in the radio frequency and/or microwave frequency range. Radio frequencies classified as high frequency (HF) band, very high frequency (VHF) band, and ultra high frequency (UHF) band may be examples of "low frequency" radiation, though embodiments of the present invention are not so limited. Frequencies in the HF, VHF and UHF bands range from 3 MHz to 1 GHz and correspond to radiation wavelengths of 30 cm to 100 m. Microwave frequencies classified as L band, S band, C band, X band, $K_u$ band, K band, and $K_a$ band may be examples of "high frequency" radiation, though embodiments of the present invention are not so limited. Frequencies in the above microwave bands range from 1 GHz to 40 GHz and correspond to radiation wavelengths of less than 1 cm to 30 cm. By utilizing both low frequency antenna elements 130 and high frequency antenna chips 110 with high frequency antenna elements, a single antenna array can receive signals from a plurality of sources and the number of separate antennas required may be reduced.

In some embodiments, the multiband antenna array 100 may be "conformal," meaning it conforms to the shape of the surface to which it is attached, even if the surface is curved, not flat. This is possible due to the multiband antenna array 100 being formed, in part, from a flexible substrate 140 which comprises a top and a bottom surface. Though the high frequency antenna chips 110 may comprise inflexible substrates (discussed in more detail below) the inflexible substrates may be small compared to the multiband antenna array 100 as a whole and the overall curvature of the surface to which the multiband antenna array 100 is attached. By way of example, and not limitation, a multiband antenna array 100 may be 10 or 20 inches in diameter, whereas each inflexible high frequency antenna chips 110 may be approximately 1 cm across and 1 mm thick. Thus, overall, the multiband antenna array 100 remains flexible even though it is comprised of one or more inflexible components.

Further, sintered nanoink, which may be used to create the low frequency antenna elements 130, is relatively flexible and not susceptible to damage when bent and stressed. This not only aids in making the antenna array conformal, but makes the antenna array "dimensionally tolerant" in that it may be robust against damage that could occur due to expansion, flexure, and deflection. For example, multiband antenna arrays of some embodiments may be tolerant of being stretched and bent on the order of inches, as opposed to copper on a printed wiring board, which may be tolerant of only a few thousandths of inches of stretching and bending.

The low frequency antenna elements 130 of multiband antenna array 100 may not be the only elements comprising sintered nanoink. For example, high frequency interconnection traces 120, which carry the received signal from the high frequency antenna elements 110 to an RF signal processor (not shown) may also be formed from nanoink. Further, any other interconnections or vias through different layers of the antenna array may also be created using nanoink.

Figure 2:
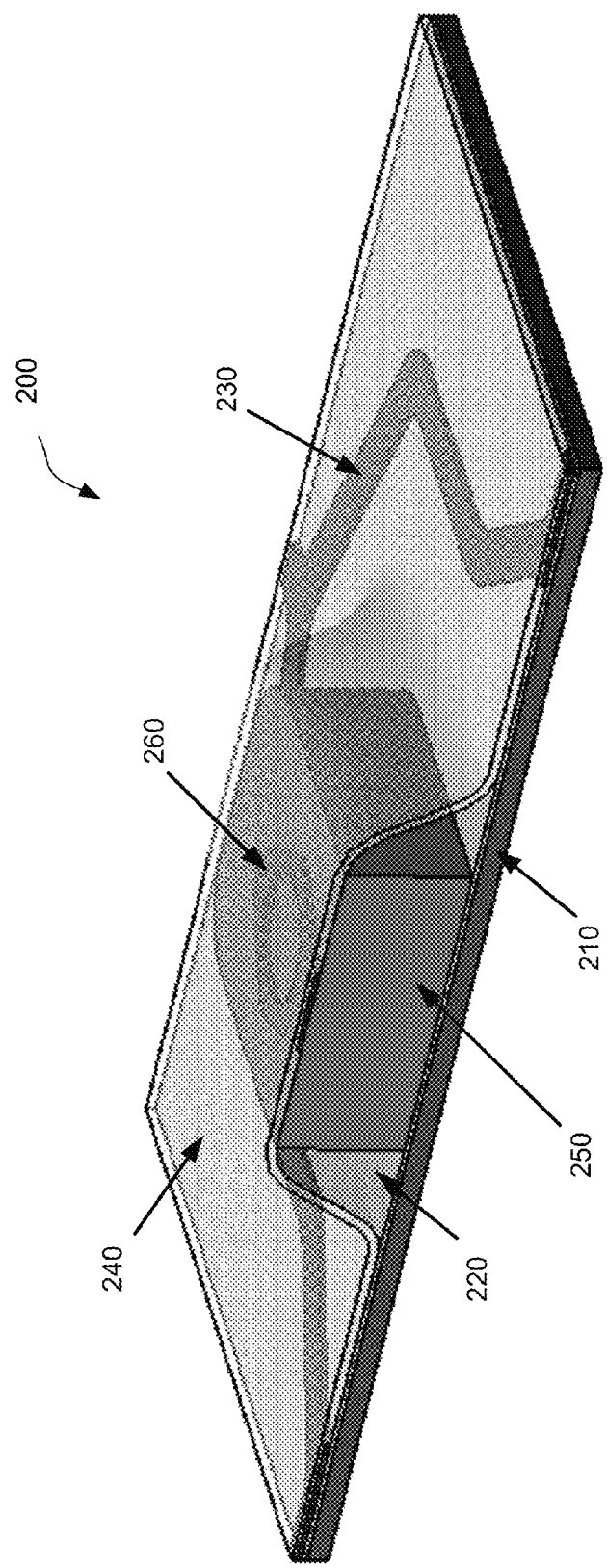
FIG. 2 is a simplified cross-section view of a multiband antenna array, according to some embodiments.

FIG. 2 illustrates a close-up cross-section of some embodiments of a multiband antenna array 200. Low frequency antenna elements 230 may be formed using nanoink. Embodiments of are not limited to any particular geometry for the low frequency antenna elements 230; any suitable shape and size for may be used. For example, FIG. 1 illustrates low frequency antenna elements 130 that are approximately rectangular. FIG. 2 illustrates low frequency antenna elements 230 that are a non-standard shape. However, any other shape may be used, such as circles, spirals, or u-shaped geometries.

Low frequency antenna elements 230 may be formed by any suitable technique. For example, nanoink may be applied to flexible substrate 240 using an inkjet nozzle using an inkjet printing technique. Alternatively, nanoink may be applied using an ink roller. In some embodiments, nanoink may be applied with a micropen dispenser. Embodiments of the present invention are not limited to any particular technique for applying nanoink to form the low frequency antenna elements 230.

Embodiments are not limited to using a flexible substrate. Any suitable substrate may be used. For example, in some embodiments the substrate may be rigid or semi-rigid.

High frequency antenna element 260 is provided on an inflexible substrate 250 which comprises a top and a bottom surface. Together, the high frequency antenna element 260 and inflexible substrate 250, comprise a high frequency antenna chip. Embodiments of are not limited to any particular type of substrate for the high frequency antenna chip; any suitable shape and size for may be used. For example, the inflexible substrate 250 may be any material that has a lower coefficient of thermal expansion (CTE) lower than the CTE of the flexible substrate 240. The inflexible substrate 250 may be, for example, silicon or ceramic. The high frequency antenna element 260 and inflexible substrate 250 may be prefabricated using techniques known in the art to create a chip that may be incorporated into multiband antenna array 200. For example, the high frequency antenna element 260 may be lithographically etched onto the top surface of the inflexible substrate 250. The high frequency antenna element 260 may be comprised of any conducting material. For example, any metal may be used, such as copper, silver or gold, though embodiments are not so limited.

FIG. 2 also illustrates a flexible insulation layer 220, which may be placed between other elements of the multiband antenna array 200 and the surface 210 to which the array is attached. This insulation layer 220 may prevent electrical short circuits caused by the metal elements of the multiband antenna array 200 coming into contact with other metal components, such as the surface 210 to which the multiband antenna array 200 is attached. The flexible insulation layer 220 may be created from any suitable material and is not limited in any way. For example, the insulation layer 220 may comprise a multi-layer flexible film. The insulation layer 220 may have a top surface and a bottom surface and may be made from the same material as the flexible substrate 240. Embodiments are not limited to any particular material.

The surface 210 to which the multiband antenna array 200 is attached may be any suitable surface. For example, it may be the surface, or "skin," of a vehicle. The vehicle is not limited in anyway. It may be an aircraft, a land vehicle, a water vehicle, or a space vehicle. By way of example, the vehicle may be an automobile, helicopter, airplane, tank, boat, or ship. In some embodiments, the skin may not be part of a vehicle. For example, the multiband antenna array 200 may be attached to a missile. Embodiments are not limited to any particular surface 210.

In some embodiments, the flexible insulation layer 220 may be adhesive, allowing the multiband antenna array 200 to be easily affixed to any surface, such as an airplane fuselage. For example, the multiband antenna array 200 with an adhesive insulation layer 220 may act as a appliqué or decal that may be retrofitted onto surfaces that were not originally designed to incorporate an antenna array. Any suitable adhesive may be used, as is known in the art.

For clarity, FIG. 2 does not show any electrical vias or interconnections, which may be implemented in any suitable way. Vias may be created between any two or more layers to allow electrical connections between elements of the array and/or signal processors located at a different location. For example, an electrical via may be formed through flexible substrate 240 to make a connection with high frequency antenna element 260. Vias may also be created through inflexible substrate 250, insulation layer 220, and/or surface 210 to make a connection to the low frequency antenna elements 230 or high frequency traces 120. Embodiments are not limited to any particular number of interconnections or placement of vias.

The vias may be formed in any suitable way. For example, an opening may be formed in any layer where a via is desired. The electrical via may then be formed by providing nanoink in the opening. The via may then be completed by sintering the nanoink by heating it. The act of sintering may be performed at the same time that the nanoink traces forming the high frequency traces 120 or the low frequency antenna elements 230 are sintered. However, embodiments are not limited to any particular method of sintering the vias.

Figure 3:
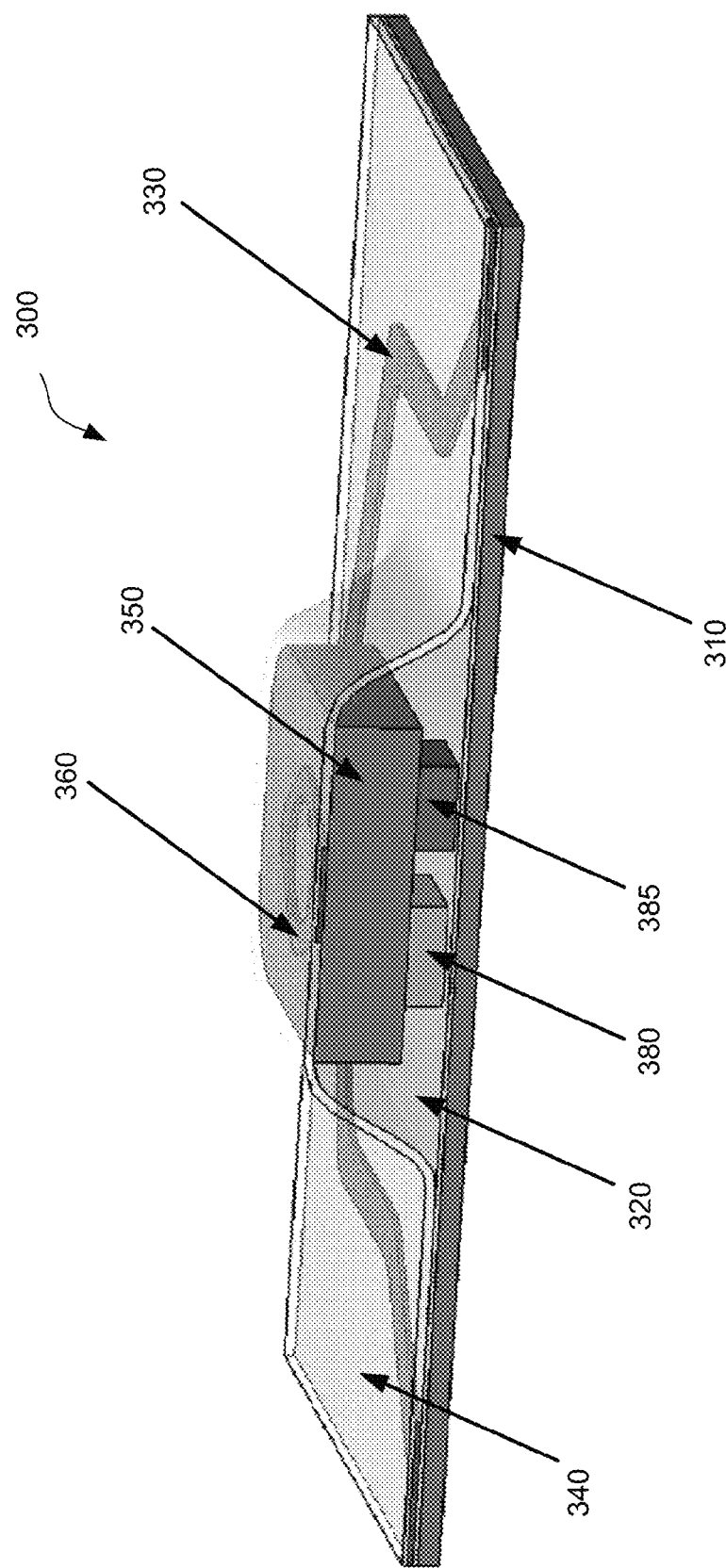
FIG. 3 is a simplified cross-section view of a multiband antenna array, according to some embodiments.

FIG. 3 illustrates a close-up cross-section of some embodiments of a multiband antenna array 300. Low frequency antenna elements 330 may be created on flexible substrate 340 as described above in connection with FIG. 2. Similarly, an insulation layer 320 may be provided between the other elements of the multiband antenna array 300 and skin 310. In some embodiments, one or more integrated circuits 380 and 385 may be provided to perform some initial processing of the signals received from each high frequency antenna element 360. Integrated circuits 380 and 385 may each have a top and bottom surface and may be, for example, mounted between the inflexible substrate 350 and the insulation layer 320. Though not shown in FIG. 3, the integrated circuits 380 and 385 may be connected to the high frequency antenna element 360 in any suitable manner, including electrical vias through inflexible substrate 350. For example, interconnects or vias may be formed using nanoink. This nanoink may be sintered at the same time as the low frequency antenna elements 330 are sintered, or at different times. Embodiments are not limited as to when the sintering occurs or how the vias are formed.

Figure 4:
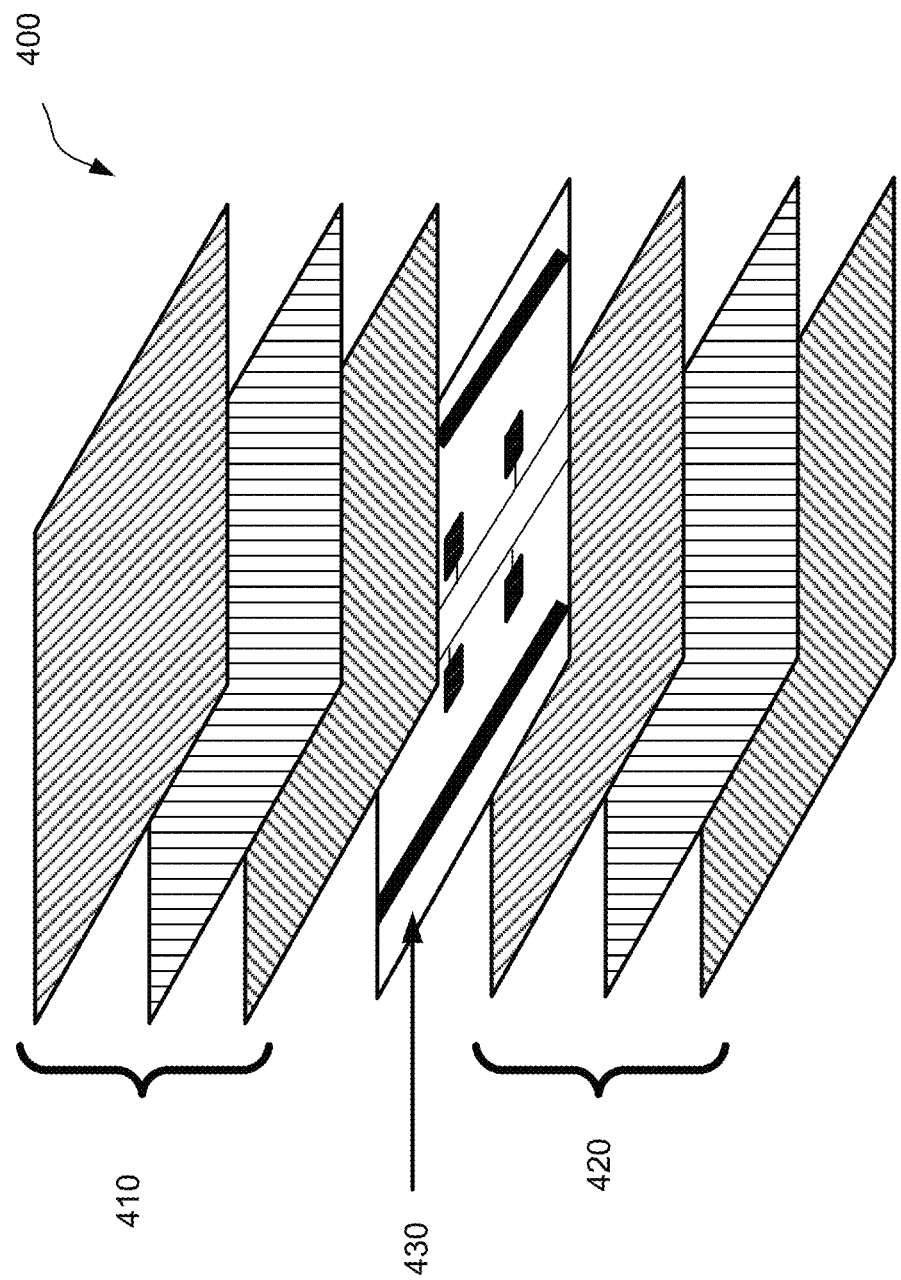
FIG. 4 is a simplified view of a multiband antenna array, according to some embodiments.

Rather than applying the antenna array as a decal to an existing surface, FIG. 4 illustrates a schematic embodiment of a multiband antenna array 430 being incorporated into a composite material 400 while the composite material is being formed. For example, a multiband antenna array may be incorporated into the fuselage or wing of an aircraft during the manufacturing process. Any suitable composite material may incorporate a multiband antenna array 430. For example, a composite RF transparent material 410 may be used. FIG. 4 illustrates such a material 400 being created with three layers 410 of RF transparent glass above the multiband antenna array 430 and three layers of carbon fiber 420 below the multiband antenna array 430. Any number of layers may be used, embodiments are not so limited. Moreover, any material may be used—RF transparent glass fiber and carbon fiber is used here as possible example materials from which to create a composite material. Any suitable resin may be used to laminate the layers 410 and 420 into a solid material with the multiband antenna array 430 incorporated. Once the composite material is formed, it may be used as a portion of any vehicle.

Figure 5:
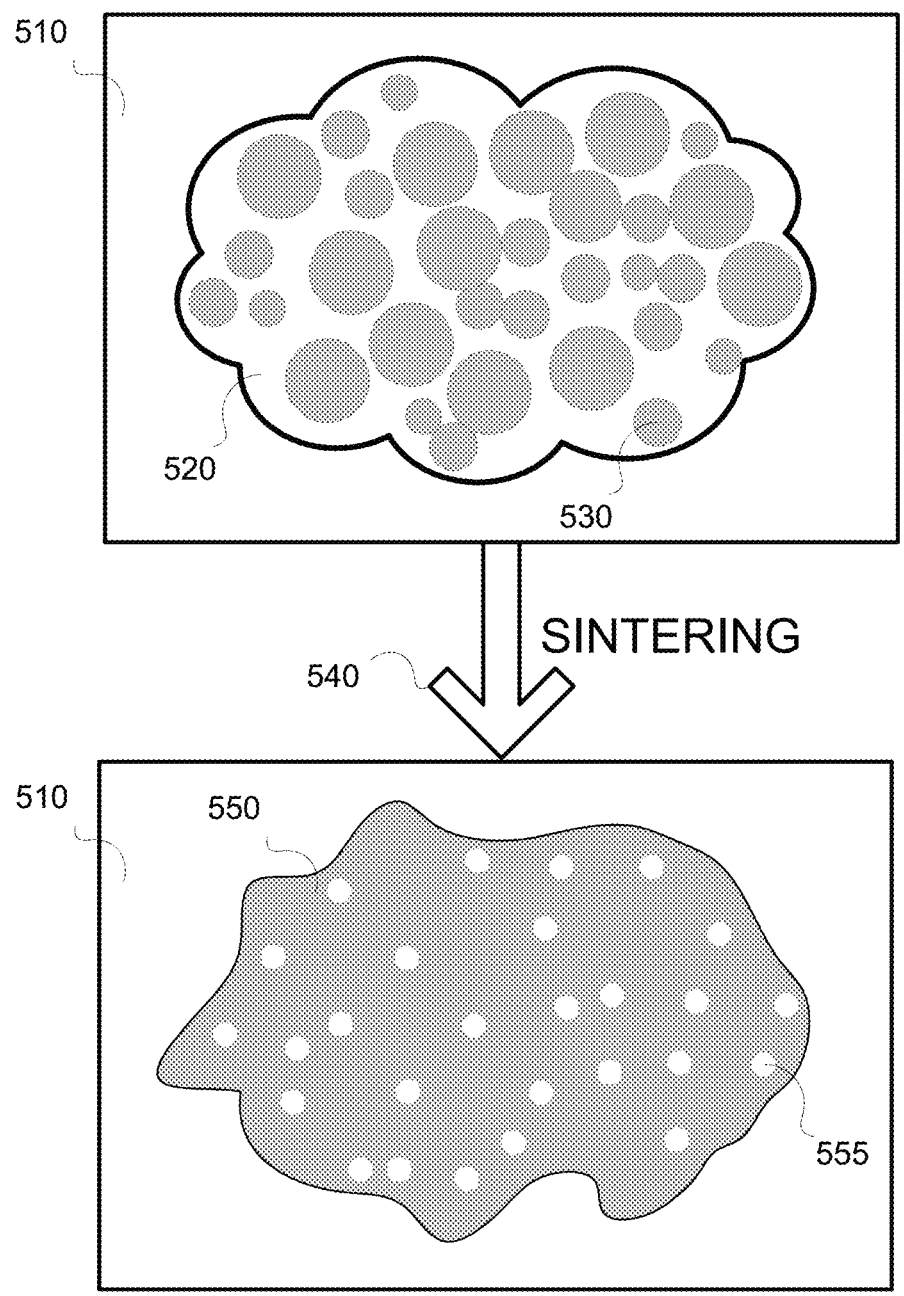
FIG. 5 is a simplified top-view illustration showing the effect of sintering on nanoink.

FIG. 5 illustrates a schematic top view of the effect of sintering nanoink. The drawing is not drawn to scale and is for illustrative purposes only; embodiments are not limited with respect to FIG. 5. FIG. 5 shows a top view of flexible substrate 510. A nanoink comprising a carrier solution 520 and electrically conductive nanoparticles 530 is applied to a portion of the flexible substrate 510. The nanoparticles 530, in this example, are not a uniform diameter. In some embodiments, the nanoink may be designed to have nanoparticles with diameters that fall within a specified range. The arrow 540 represents the sintering process, which may occur in any suitable manner, such as those described in various embodiments above. After the sintering is complete, the carrier solution 520 has evaporated and the electrically conductive nanoparticles 530 have melted and amalgamated together to form a bulk metal 550 on the flexible substrate 510. Incomplete evaporation of the carrier solution may result in porosity within the bulk metal 550. These pores 555 are shown for illustrative purposes and are not drawn to scale and do not represent the actual density of pores 555 that may result. The minimal porosity has negligible effects on the structural performance of the sintered nanoink. It is envisioned that the porosity may be intentionally adjusted to allow tuning the strength of the bond to adjust the elasticity of the sintered nanoink.

Figure 6:
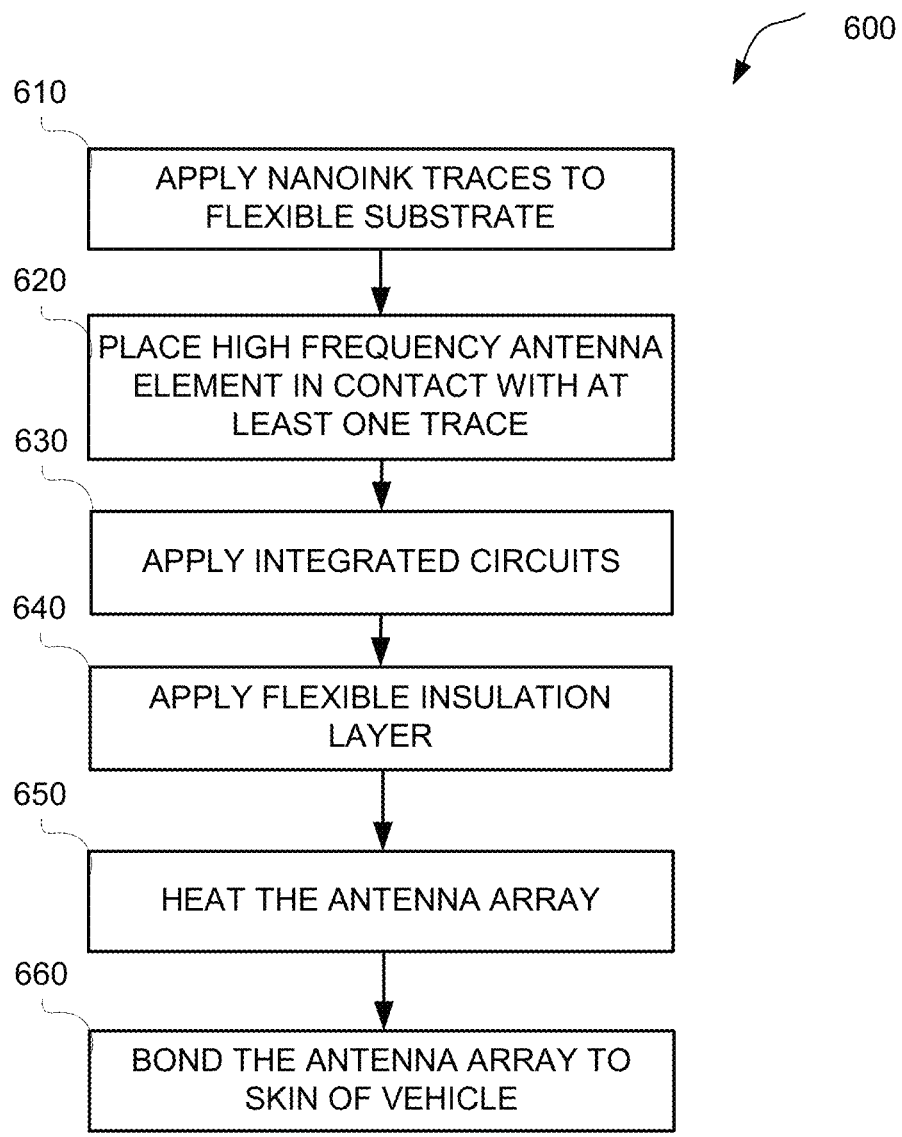
FIG. 6 is a flow chart of an exemplary process of constructing a multiband antenna array.

FIG. 6 is a flow chart of an exemplary process of constructing a multiband antenna array according to some embodiments. Not all acts shown are necessary and/or the order of the steps may be interchangeable for some embodiments. Moreover, additional steps that are not shown may be performed during the process.

The process begins by applying 610 nanoink traces to the flexible substrate. As discussed above in connection with FIGS. 1-3, the nanoink may be applied in any suitable way. For example, an inkjet process employing an inkjet nozzle may be employed to lay out the traces on the flexible substrate. It is also possible to use a micropen dispenser to apply the traces. However, embodiments of the invention are not so limited. The traces that are created may ultimately become high frequency antenna traces, interconnections, vias, and/or the low frequency antenna elements.

At act 620, prefabricated high frequency antenna elements are placed such that at least a portion of the high frequency antenna elements is in contact with at least one of the traces. In some embodiments, integrated circuits may be applied 630 to perform initial processing of the received signals form the antenna array.

At act 640, the flexible insulation layer may be applied. The antenna array may then be heated at act 650. Heating may occur in any suitable way to sinter the nanoink. For example, the multiband antenna array may be placed in an oven. In some embodiments, the temperature of the oven may be less than 300 degrees Celsius. The oven may also be less than 200 degrees Celsius. In some embodiments the oven may be between 150 and 185 degrees Celsius. Any temperature may be used that is above the melting point of the nanoparticles of the nanoink. The temperature may also be chosen to be lower than temperatures that may deform or cause damage to other portions of the antenna array. For example, some solder has a melting point of 185 degrees Celsius. If any component of the antenna array comprises this type of solder, it is desirable to use an oven set at a temperature lower than 185 degrees Celsius.

After the nanoink is sintered, the multiband antenna array may be bonded or attached 660 to the surface of a vehicle. This may be accomplished in any suitable way. For example, the flexible insulation layer may be adhesive on the outside surface. Alternatively, an adhesive may be applied to either the insulation layer or the skin of the vehicle and the antenna array may be bonded to the vehicle in this manner. However, embodiments are not limited to any particular way of attaching the antenna array to the vehicle.

Embodiments described herein are not limited to any particular application. For example, a multiband antenna array may be used for radar, GPS, wireless internet, signals, electronic intelligence (ELINT) or any number of applications. For example, a multiband antenna of some embodiments may be used on the roof of an automobile to receive GPS signals or wireless internet signals.

This invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for fabricating a multiband antenna array, the method comprising:
   applying nanoink traces to a substrate, wherein the nanoink traces comprise at least one low-frequency antenna element and at least one interconnection;
   placing at least one high-frequency antenna chip in contact with the at least one interconnection; and
   heating the multiband antenna array.

2. The method of claim 1, wherein:
   heating multiband antenna array is performed in an oven with a temperature of less than 300 degrees Celsius.

3. The method of claim 1, wherein the substrate is a flexible substrate.

4. The method of claim 3, further comprising:
   prior to heating the multiband antenna array, applying a flexible insulation layer over the nanoink traces on the flexible substrate.

5. The method of claim 4, wherein:
   at least one surface of the flexible insulation layer is adhesive.

6. The method of claim 5, further comprising:
   attaching the multiband antenna array to an object using the at least one adhesive surface of the flexible insulation layer.

7. The method of claim 6, wherein the object is a vehicle.

8. The method of claim 1, wherein:
   applying the nanoink traces to the substrate comprises using an ink jet nozzle.

9. The method of claim 1, wherein:
   applying the nanoink traces to the substrate comprises using a micropen dispenser.

10. The method of claim 1, wherein:
    the nanoink traces are formed using nanoink comprising nanoparticles formed from at least one electrically conductive material.

11. The method of claim 10, wherein:
    the electrically conductive material is comprised of a metal selected from the metallic group consisting of silver, copper, gold and platinum.

12. The method of claim 1, wherein the at least one high-frequency antenna chip comprises an inflexible substrate.

13. The method of claim 1, wherein the substrate is an inflexible substrate.

14. The method of claim 10, wherein the nanoparticles comprise carbon nanotubes or buckminsterfullerene.

15. The method of claim 1, wherein applying nanoink traces is performed using an inkjet nozzle.

16. The method of claim 1, wherein the at least one high-frequency antenna chip includes at least one integrated circuit configured to process a signal received from the multiband antenna array.

17. The method of claim 1, wherein:
    heating multiband antenna array is performed in an oven with a temperature of less than 200 degrees Celsius.

18. The method of claim 6, wherein attaching the multiband antenna array to the object comprises attaching the multiband antenna to a curved surface of the object.

19. The method of claim 7, wherein the vehicle is an aircraft.

20. The method of claim 1, further comprising:
    enclosing the multiband antenna array between a top composite layer and a bottom composite layer.

21. The method of claim 20, wherein the top composite layer and the bottom composite layer comprise carbon fiber.

22. The method of claim 20, wherein at least one of the top composite layer and the bottom composite layer comprises a radiofrequency transparent material.

* * * * *